US010634766B2

(12) United States Patent
Stachnik et al.

(10) Patent No.: US 10,634,766 B2
(45) Date of Patent: Apr. 28, 2020

(54) METHOD OF DETERMINING THE DE-ALIASED RANGE RATE OF A TARGET

(71) Applicant: Aptiv Technologies Limited, St. Michael (BB)

(72) Inventors: Mateusz Stachnik, Gdow (PL); Dariusz Cieslar, Cracow (PL); Krzysztof Kogut, Cracow (PL)

(73) Assignee: Aptiv Technologies Limited (BB)

( * ) Notice: Subject to any disclaimer, the term of this patent is extended or adjusted under 35 U.S.C. 154(b) by 117 days.

(21) Appl. No.: 16/004,493

(22) Filed: Jun. 11, 2018

(65) Prior Publication Data

US 2018/0356498 A1 Dec. 13, 2018

(30) Foreign Application Priority Data

Jun. 12, 2017 (EP) .................................... 17175554

(51) Int. Cl.
*G01S 7/295* (2006.01)
*G01S 13/58* (2006.01)
(Continued)

(52) U.S. Cl.
CPC ............ *G01S 7/295* (2013.01); *G01S 7/2921* (2013.01); *G01S 13/42* (2013.01); *G01S 13/58* (2013.01);
(Continued)

(58) Field of Classification Search
CPC ................... G01S 13/931; G01S 13/58; G01S 13/581–13/584; G01S 13/588; G01S 13/589

See application file for complete search history.

(56) References Cited

U.S. PATENT DOCUMENTS 5,414,643 A * 5/1995 Blackman ............. G01S 13/726
342/95
6,380,884 B1 * 4/2002 Satou ...................... G01S 13/42
342/147
(Continued)

FOREIGN PATENT DOCUMENTS

DE 10 2015 222884 A1 5/2017

OTHER PUBLICATIONS

Kellner Dominik et al: "Instantaneous full-motion estimation of arbitrary objects using dual Doppler radar", Jun. 8, 2014, pp. 325-327.

*Primary Examiner* — Peter M Bythrow
(74) *Attorney, Agent, or Firm* — Joseph V. Bonadies

(57) ABSTRACT

A method of determining the de-aliased range rate of a target in a horizontal plane by a host vehicle equipped with a radar system, said radar system including a radar sensor unit adapted to receive signals emitted from said host vehicle and reflected by said target, comprising: emitting a radar signal at a single time-point instance and determining from a plurality (m) of point radar detections measurements therefrom captured from said radar sensor unit, the values for each point detection of, azimuth and range rate; $[\theta_i, \dot{r}_i]$; for each point detection determining a range rate compensated value $(\dot{r}_{i,cmp})$; c) determining a plurality (j) of velocity profile hypotheses; for each (j-th) hypothesis determining modified compensated hypothesis range rates $(\dot{r}_{i,j,cmp})$ in respect of each point detection on the target, based on the values of range rate compensated $(\dot{r}_{i,cmp})$; for each j-th hypothesis, determining values of the longitudinal and lateral components of the range rate equation of the target $\tilde{c}_{t,j}$ and $+\tilde{s}_{t,j}$; for each j-th hypothesis and for each point detection determining a velocity profile estimator range rate $(\hat{\dot{r}}_{i,j,cmp})$; for each hypothesis, for one or more point detections, determining a measure of the dispersion of, or variation between the (Continued)

velocity profile estimator range rates ($\hat{r}_{i,j,cmp}$) for each velocity profile hypothesis and their respective modified range rates ($\hat{r}_{i,j,cmp}$) from step d), or the dispersion of, or variation between, one or both of the velocity profile components $\tilde{c}_{t,j}$ and $\tilde{s}_{t,j}$ for each velocity profile hypothesis, and selecting the velocity profile where said measure of dispersion or variation is the lowest; setting the de-aliased range rate as the velocity of the velocity hypothesis selected.

5 Claims, 10 Drawing Sheets

(51) Int. Cl.
    *G01S 13/93*         (2020.01)
    *G01S 7/292*         (2006.01)
    *G01S 13/42*         (2006.01)
    *G01S 13/72*         (2006.01)
    *G01S 13/931*       (2020.01)

(52) U.S. Cl.
    CPC .......... *G01S 13/581* (2013.01); *G01S 13/582* (2013.01); *G01S 13/584* (2013.01); *G01S 13/588* (2013.01); *G01S 13/589* (2013.01); *G01S 13/726* (2013.01); *G01S 13/931* (2013.01); *G01S 2013/9353* (2013.01); *G01S 2013/9375* (2013.01)

(56) References Cited

U.S. PATENT DOCUMENTS

| | | | | |
|---|---|---|---|---|
| 6,445,344 | B1* | 9/2002 | Wise | G01C 21/165 |
| | | | | 342/450 |
| 6,628,227 | B1* | 9/2003 | Rao | G01S 13/931 |
| | | | | 342/70 |
| 6,646,589 | B2* | 11/2003 | Natsume | G01S 7/354 |
| | | | | 342/107 |
| 8,654,005 | B2* | 2/2014 | Christopher | G01S 13/72 |
| | | | | 342/137 |
| 8,970,429 | B2* | 3/2015 | Pickle | G01S 13/726 |
| | | | | 342/159 |
| 9,933,520 | B1* | 4/2018 | Campbell | G01S 13/325 |
| 2005/0285773 | A1* | 12/2005 | Hartzstein | G01S 7/032 |
| | | | | 342/70 |
| 2011/0181456 | A1* | 7/2011 | Luebbert | G01S 13/343 |
| | | | | 342/70 |
| 2013/0176162 | A1* | 7/2013 | Vincent | G01S 7/414 |
| | | | | 342/107 |
| 2016/0103214 | A1* | 4/2016 | Clark | G01S 13/87 |
| | | | | 342/59 |
| 2019/0361106 | A1* | 11/2019 | Stachnik | G01S 13/584 |

\* cited by examiner

METHOD OF DETERMINING THE DE-ALIASED RANGE RATE OF A TARGET

TECHNICAL FIELD OF INVENTION

This disclosure relates to an on-board vehicle method of determining de-aliased range rates of a target such as another vehicle.

BACKGROUND OF INVENTION

Typically, (host) vehicles may be equipped with radars systems used to classify the environment in the vicinity of the vehicle such as to e.g. detect moving or static objects around the vehicle. Such systems are used to for example, to estimate the motion state of other vehicles for automotive perception systems and can be used in Active Safety, Driver Assistance and Autonomous Driving applications.

Typically, such systems may include Doppler radar methodology where reflected radar signals are detected and analyzed in the frequency domain, typically by applying Fast Fourier Transform methodology. So, Doppler radar measurements are usually extracted by applying the Fast Fourier Transform to the baseband signal captured from the environment. Typically results are divided into a number of frequency ranges—referred to often as bins. The span of frequencies is limited by design. This results in a limited interval of unambiguous range rate measurement. Measurements beyond that span of frequencies fall into FFT bins that do not directly correspond to the velocity of the target. This is the phenomenon of range rate aliasing. Determination of the appropriate aliasing period or range rate is required to correct the measurement of the relative velocity; i.e. between the host vehicle and a target (such as another vehicle or object). The procedure of such a correction is called de-aliasing. The standard approach to resolving range rate measurement aliasing is to track the target in time and identify the appropriate aliasing period based on the change of the target position.

It is an object of the invention to provide an improved method for the de-aliasing of range rate instantaneously in a single time instance. The fundamental condition for applicability of the proposed solution is that there are several point detections captured by the Doppler radar from a single target (such target is usually referred to as a distributed/rigid target).

So aspects of the invention provides a method for instantaneous de-aliasing of range rate measurements (of Doppler radar) for distributed targets This invention applies (e.g.) a plausibility check of velocity profile estimation to determine the appropriate aliasing period. The complete procedure for instantaneous de-aliasing is described including the necessary assumptions.

It is an object of the invention to provide a method of determining aliasing range rates which is not based on tracking or filtering and therefore does not require any motion model and no initialization stage is required. Solutions provide calculation of de-aliased range rates based on a single time instance measurement of a Doppler radar.

SUMMARY OF THE INVENTION

In one aspect is provided a method of determining the de-aliased range rate of a target in a horizontal plane by a host vehicle equipped with a radar system, said radar system including a radar sensor unit adapted to receive signals emitted from said host vehicle and reflected by said target, comprising: emitting a radar signal at a single time-point instance and determining from a plurality (m) of point radar detections measurements therefrom captured from said radar sensor unit, the values for each point detection of, azimuth and range rate $[\theta_i, \dot{r}_i]$; b) for each point detection determining a range rate compensated value $(\dot{r}_{i,cmp})$ from the output of step a) and the vehicle or sensor unit speed from the following equation $\dot{r}_{i,cmp} = \dot{r}_i + u_s \cos \theta_i + v_s \sin \theta_i$, where $u_s$ is the host vehicle or sensor longitudinal velocity and $v_s$ is the host vehicle or sensor lateral velocity; c) determining a plurality (j) of velocity profile hypotheses; d) for each (j-th) hypothesis determining modified compensated hypothesis range rates $(\dot{r}_{i,j,cmp})$ in respect of each point detection on the target, based on the values of range rate compensated) $(\dot{r}_{i,cmp})$ determined from step b) from the following equation $\dot{r}_{i,j,cmp} = \dot{r}_{i,cmp} + j\dot{r}_{ua}$, where $\dot{r}_{ua}$ is the interval of measured range rate; for each j-th hypothesis, determining values of the longitudinal and lateral components of the range rate equation of the target $\tilde{c}_{t,j}$ and $+\tilde{s}_{t,j}$ from the results of step d) and a) where the range rate equation is $$\dot{r}_{i,j,cmp} = [\cos\theta_i \ \sin\theta_i]\begin{bmatrix} c_{t,j} \\ s_{t,j} \end{bmatrix};$$

f) for each j-th hypothesis and for each point detection determining a velocity profile estimator range rate $(\hat{\dot{r}}_{i,j,cmp})$ calculated from the following equation $\hat{\dot{r}}_{i,j,cmp} = \tilde{c}_{t,j} \cos \theta_i + \tilde{s}_{t,j} \sin \theta_i$, where the values of $\theta_i$ are determined from step a) and $\tilde{c}_{t,j}$ and $\tilde{s}_{t,j}$ the values of velocity profile components from step e); g) for each hypothesis, for one or more point detections, determining a measure of the dispersion of, or variation between, the velocity profile estimator range rates $(\hat{\dot{r}}_{i,j,cmp})$ for each velocity profile hypothesis from step f) and their respective modified range rates $(\dot{r}_{i,j,cmp})$ from step d), or the dispersion of, or variation between, one or both of the velocity profile components $\tilde{c}_{t,j}$ and $\tilde{s}_{t,j}$ for each velocity profile hypothesis, and selecting the velocity profile where said measure of dispersion or variation is the lowest; and h) setting the de-aliased range rate as the velocity of the velocity hypothesis selected from step f).

The velocity profile components $\tilde{c}_{t,j}$ and $\tilde{s}_{t,j}$ may be determined from least squares methodology.

The method may include determining for each velocity hypothesis, a measure of the dispersion or average value, in respect of each point detection, of the differences between the values of the velocity profile estimator range rates from step f) and the respective modified hypothesis range rates from step d).

The measure of the variation or dispersion may be determined from the following formula, where n is the number of point detections used in the calculation:

$$\frac{\sum_{1}^{n}\left(\dot{r}_{i,j,cmp} - \hat{\dot{r}}_{i,j,cmp}\right)^2}{n-2}.$$

BRIEF DESCRIPTION OF DRAWINGS

The present invention is now described by way of example with reference to the accompanying drawings in which:

FIG. 9a shows a target vehicle scenario and FIGS. 9b and 9c show diagrammatic representations of velocity profile hypotheses in relation to FIG. 9a;

FIG. 10a shows a target vehicle scenario and FIGS. 10b and 10c show diagrammatic representations of velocity profile hypotheses in relation to FIG. 10a;

FIG. 11a shows a target vehicle scenario and FIGS. 11b and 11c show diagrammatic representations of velocity profile hypotheses in relation to FIG. 11a;

DETAILED DESCRIPTION

Figure 1:
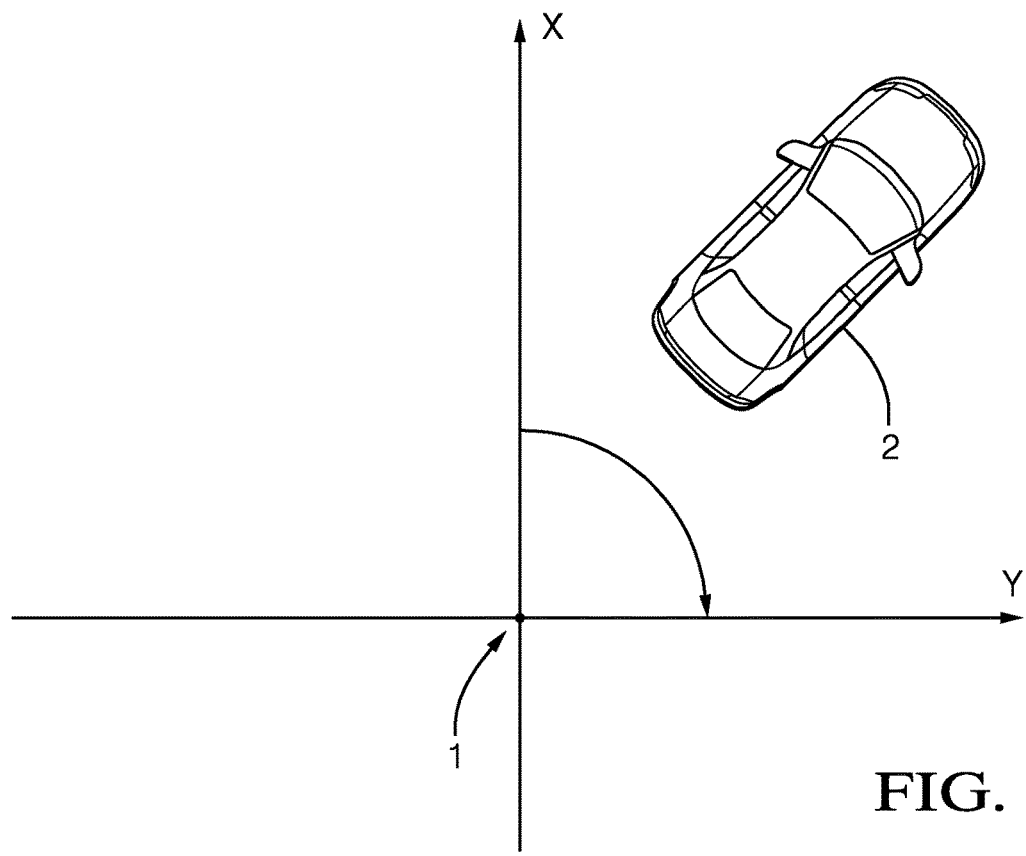
FIG. 1 shows a target co-ordinate system.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Generally, a host vehicle is equipped with a radar system where reflected radar signals (detection) from another vehicle in the field of view are processed to provide data to ascertain the parameters used in the methodology. To do this various conditions and requirements are needed, the target (rigid body/vehicle) needs to be a distributed target, i.e. provide a plurality of detections from the same target; i.e. extended targets (largely, for vehicle tracking) in real-time based on raw radar detections (i.e., range-rate, and azimuth). As used herein, the term 'extended-targets' is used to refer to targets that present multiple, spaced-apart scattering-points so the term 'extended-target' is understood to mean that the target has some physical size. The various scattering-points are not necessarily individually tracked from one radar scan to the next, so the number of scatter-points can be a different quantity and/or each scattering point have a different location on the extended-target in successive radar scans.

Also assumed is an approximation of the distributed target by a rigid body model which is e.g. appropriate for vehicles (passenger cars, trucks, motorbikes, trains, trams, etc.), though not generally applicable to vulnerable road users.

Radar detections received by the host vehicle (reflected) from the target provide raw data with respect to the position of a radar transmit/receive element/unit on the host vehicle, and can give the Cartesian position of the detection or the Polar co-ordinates (azimuth angle, range). By using e.g. Doppler techniques, the range rate can also be determined. It is to be noted that the "raw data" from this single radar look provides the parameters of $\theta_i$—azimuth angle, $\dot{r}_i$—raw range rate (or radial velocity) for each "i"th point of m point detections on a rigid body. These are the parameters which are used to determine the de-aliased range rates, where i=1, . . . , m. It is to be noted that the term instantaneous or single look radar data would include reflection data from a "chirp" in Doppler techniques which may scan over e.g. up to 2 ms. By this known methodology range rate may be determined. In the subsequent concept description the following conventions and definitions are used:

World Coordinate System

As is convention an inertial coordinate system with the origin fixed to a point in space is used—it is assumed the co-ordinate system does not move and does not rotate. Conventionally the coordinate system is right-handed; the Y-axis orthogonal to the X-axis, pointing to the right; the Z-axis pointing into the page and positive rotation is to the right of the X-axis; see FIG. 1 which shows such a co-ordinate system with origin 1 and a non-ego vehicle 2.

Vehicle Coordinate System

Figure 2:
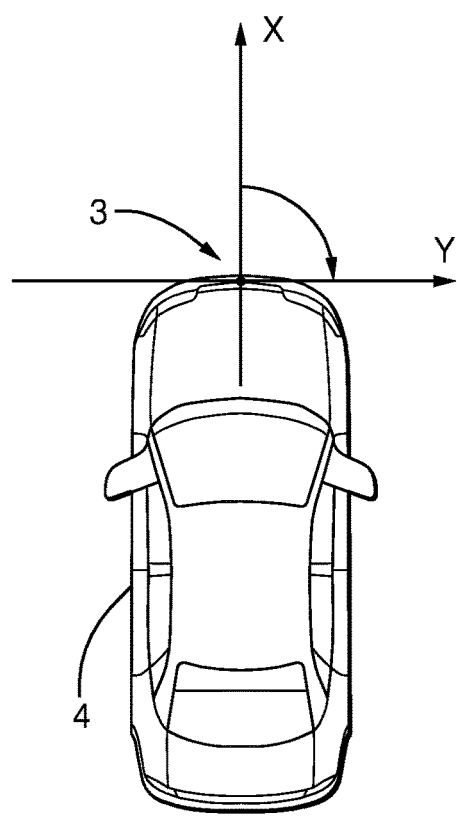
FIG. 2 shows a vehicle coordinate system.
Figure 3:
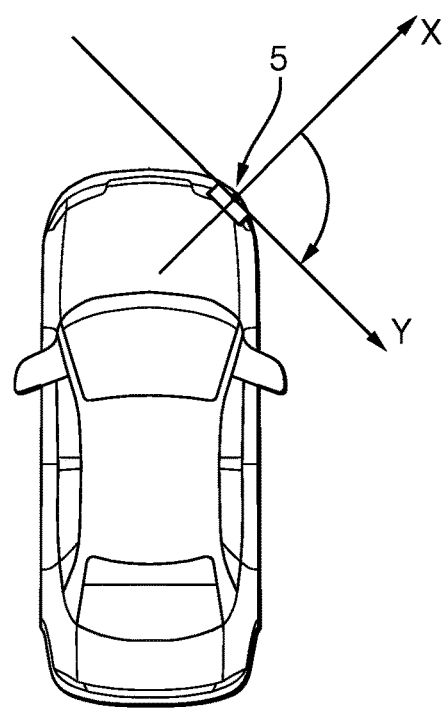
FIG. 3 shows a sensor coordinate system.

The origin may be located at the center of the front bumper 3 of the host vehicle 4 as shown by FIG. 2. The X-axis is parallel to the longitudinal axis of the vehicle. The coordinate system is right-handed with the Y-axis orthogonal to the X-axis, pointing to the right, the Z-axis pointing into the page and positive rotation to the right of the X-axis Sensor Coordinate System Origin located at the center of the sensor unit/radome. The X-axis is perpendicular to the sensor radome, pointing away from the radome. The coordinate system is right-handed: Y-axis orthogonal to the X-axis, pointing to the right; Z-axis pointing into the page; Positive rotation to the right of the X-axis. FIG. 3 shows a sensor origin 5.

In aspects of the invention and with prior art techniques, the velocity and the yaw rate of the host vehicle is assumed known. The host over the ground (OTG) velocity vector is defined as $V_h=[u_h v_h]^T$, where $u_h$—host longitudinal velocity and $v_h$—host lateral velocity.

Sensor mounting position and boresight angle in the vehicle coordinate system are also assumed known; the following notations are used: $x_{s,VCS}$—sensor mounting position, longitudinal coordinate; $y_{s,VCS}$—sensor mounting position, lateral coordinate; and $\gamma_{s,VCS}$—sensor boresight angle.

The sensor(s) Over the Ground (OTG) velocities are assumed known (determined from host vehicle motion and sensor mounting positions).

Sensor velocity vector is defined as $V_s=[u_s \ v_s]^T$ with $u_s$—sensor longitudinal velocity and $v_s$—sensor lateral velocity.

At each radar measurement instance, the radar unit/sensor captures m raw detections from the target. Each raw detection is described by the following parameters expressed in the sensor coordinate system: $r_i$—range (or radial distance); $\theta_i$—azimuth angle; and $\dot{r}_i$—raw range rate (or radial velocity) i=1, . . . , m.

Target planar motion is described by the Target over-the-ground velocity vector at the location of each raw detection $V_{t,i}=[u_{t,i} \ v_{t,i}]^T$, where: $u_{t,i}$—longitudinal velocity at the location of i-th raw detection; and $v_{t,i}$—lateral velocity at the location of i-th raw detection.

Target planar motion can be described as well by $V_{t,COR}=[\omega_t \ x_{t,COR} \ y_{t,COR}]^T$, where $\omega_t$—target yaw rate; $x_{t,COR}$—longitudinal coordinate of the center of target's rotation; and $y_{t,COR}$—lateral coordinate of the center of target's rotation.

Figure 4:
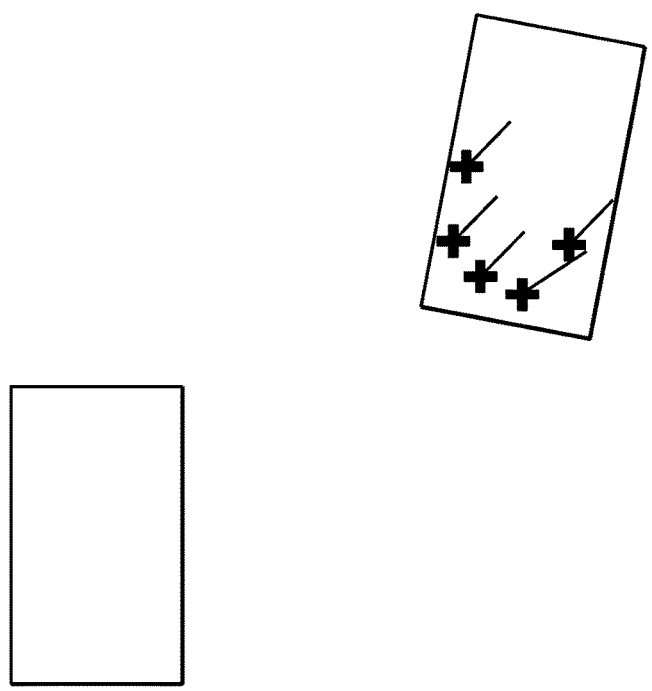
FIG. 4 shows a target vehicle with respect to a host vehicle with point detections.

FIG. 4 illustrates how to calculate velocity vectors at the locations of raw detections (depicted by reference numeral 6) by a host vehicle 4 captured from the same rigid body target 2.

The range rate equation for a single raw detection is given as follows: $\dot{r}_i + u_s \cos\theta_i + v_s \sin\theta_i = u_{t,i} \cos\theta_i + v_{t,i} \sin\theta_i$.

To simplify the notation, the notion of a compensated/modified range rate is introduced and defined as: $\dot{r}_{i,cmp} = \dot{r}_i + u_s \cos\theta_i + v_s \sin\theta_i$, where $\dot{r}_{i,cmp}$=range rate compensated of i-th raw detection.

Then the equation is reduced to $\dot{r}_{i,cmp} = u_{t,i} \cos\theta_i + v_{t,i} \sin\theta_i$.

Range rate equation in vector form $$\dot{r}_{i,cmp} = [\cos\theta_i \ \sin\theta_i]\begin{bmatrix} u_{t,i} \\ v_{t,i} \end{bmatrix}.$$

Range rate equation in vector form with two coefficients: $c_i$—longitudinal range rate equation coefficient; and $s_i$—lateral range rate equation coefficient. Velocity profile is used as range rate equation coefficients synonym. Estimated values are denoted with a hat. Least Square solutions are denoted with a tilde.

The problem to be solved can be phrased as follows: calculate de-aliased range rates based on a single time instance measurement of a Doppler radar. Doppler radar measurements are usually extracted by applying the Fast Fourier Transform to the baseband signal captured from the environment. The span of frequencies is limited by design. This results in a limited interval of unambiguous range rate measurement.

PRIOR ART

This section briefly reviews the literature available in public domain and company internal reports. Building blocks for the approach proposed in this ROI are acknowledged and their sources identified.

Cloud Algorithm

The case of a straight-line moving distributed target has been considered. This restriction simplifies the estimation problem as the velocity vectors at the location of each raw detections are identical, i.e. —

$$V_{t,i}=[u_{t,i} v_{t,i}]^T=[u_t v_t]^T=V_t \text{ for } i=2,\ldots,m.$$

The Cloud Algorithm (CA) was proposed to estimate over-the-ground lateral $v_t$ and longitudinal $u_t$ velocity of the "cloud" of detections coming from the same target.

This was achieved by Least Square solution to the problem defined as follows:

$$\dot{r}_{i,cmp} = [\cos\theta_i \ \sin\theta_i]\begin{bmatrix} u_t \\ v_t \end{bmatrix}.$$

The algorithm proved to be a very effective technique for instantaneous estimation of target velocity. In D. Kellner, M. Barjenbruch, K. Dietmayer, J. Klappstein, and J. Dickmann, "Instantaneous lateral velocity estimation of a vehicle using Doppler radar," in Proceedings of 16th International Conference on Information Fusion, Istanbul, Turkey, 2013, the same problem and the same theoretical basis for the estimation of lateral velocity of a straight line moving object was considered. The authors proposed enhancement to the Cloud Algorithm by means of executing RANSAC algorithm to identify outliers: executing orthogonal distance regression (ODR) to solve error-in-variables problem for the modified formulation of the original problem.

The authors demonstrated improved robustness of their solution in comparison to the original Cloud Algorithm solution. Computational complexity and the requirement to solve an optimization problem are the major drawbacks of the proposed approach, especially when an application in a production embedded system is to be considered.

Cloud Algorithm Solution for Yawing Targets

Figure 5:
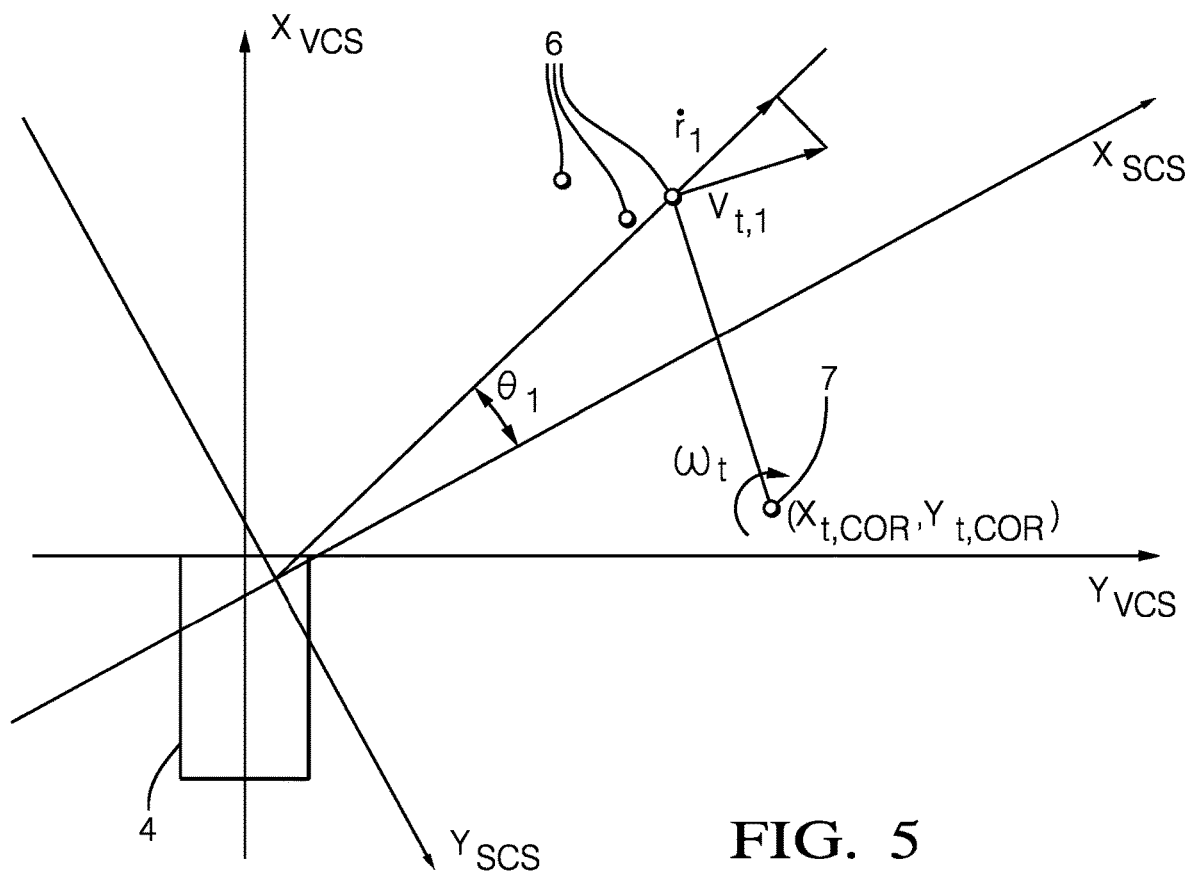
FIG. 5 illustrates how to calculate velocity vectors at the locations of three raw detections.

The application of the cloud algorithm to the estimation of target's motion without the restriction on straight-line path was investigated. Such situation in shown in FIG. 5. The over-the-ground velocity vectors at the location of each detection 6 are determined as follows:

$$\begin{bmatrix} u_{t,i,scs} \\ v_{t,i,scs} \end{bmatrix} = \begin{bmatrix} (y_{t,COR,scs} - y_{t,i,scs})\omega_t \\ (x_{t,i,scs} - x_{t,COR,scs})\omega_t \end{bmatrix}.$$

The range rate equation for each raw detection was derived to be: $\dot{r}_{i,cmp}=(y_{t,COR,scs}-y_{t,i,scs})\omega_t \cos\theta_i+(x_{t,i,scs}-x_{t,COR,scs})\omega_t \sin\theta_i$.

This equation can be reduced since: $y_{t,i,scs}\cos\theta_i=r_{t,i}\sin\theta_i\cos\theta_i=x_{t,i,scs}\sin\theta_i$, then $\dot{r}_{i,cmp}=(y_{r,COR,scs})\omega_t \cos\theta_i+(-x_{t,COR,scs})\omega_t \sin\theta_i$.

Notice that range measurement is cancelled in the above equation and does not support the velocity estimation.

It was then shown that the Least Square solution to this problem results in:

$$\tilde{c}_{t,scs} = (y_{t,COR,scs})\omega_t$$

$$\tilde{s}_{t,scs} = (-x_{t,COR,scs})\omega_t$$

$$\dot{r}_{i,cmp} = [\cos\theta_i \quad \sin\theta_i] \begin{bmatrix} c_t \\ s_t \end{bmatrix}$$

Estimator of the velocity is:

$$\tilde{u}_{t,i,scs} = \tilde{c}_{t,scs} + (-y_{t,i,scs})\omega_t$$

$$\tilde{v}_{t,i,scs} = \tilde{s}_{t,scs} + (x_{t,i,scs})\omega_t.$$

Although the Least Square solution does not estimate velocity vector itself, it can be treated as a biased velocity vector estimator in case of yawing target. Thus, velocity profile estimation can be used as a valuable information for velocity vector estimation in both cases: straight-line moving and yawing target. Note the centre of rotation of target is shown by reference numeral 7.

Figure 6:
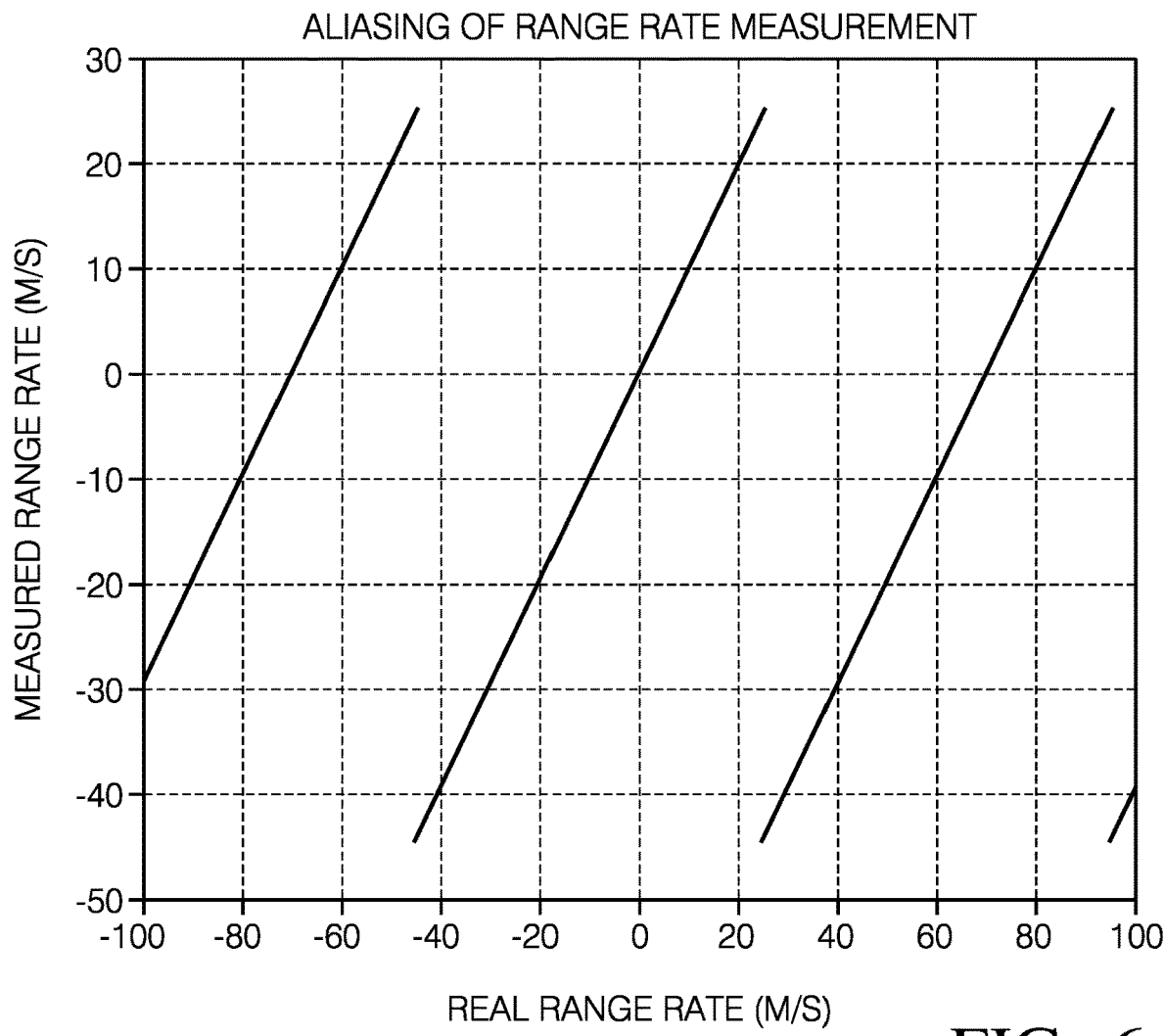
FIG. 6 shows aliasing of range rate measurement and shows plots of measured range rate against real range rate.

FIG. 6 shows aliasing of range rate measurement and shows plots of measured range rate against real range rate. As can be seen on the Y axis, the measured range rate extends from nominal values of +25 to −45, as shown by the large bracket. The interval of measured range rate is thus 70. This interval determined by the radar specification and is important in the calculations hereinafter

DETAILED DESCRIPTION OF INVENTION

The invention provides a method for Instantaneous de-aliasing of range rate measurements (of Doppler radar) for distributed targets

Example 1

Step 1

In an initial step the method comprises emitting a radar signal at a single time-point instance and determining from a plurality (m) of point radar detections measurements therefrom captured from said radar sensor unit in a said single radar measurement instance the values for each point detection of azimuth and range rate; $[\theta_i, \dot{r}_i]$ Thus there are several point detections captured by the Doppler radar from a single target (such target is usually referred to as a distributed target) as shown in FIG. 4.

Step 2

In the next step range rate compensated by sensor speed is calculated $\dot{r}_{i,cmp} = \dot{r}_i + u_s \cos\theta_i + v_s \sin\theta_i$, where $\dot{r}_i$—raw range rate (or radial velocity); $\theta_i$— raw azimuth angle; $\dot{r}_{i,cmp}$—range rate compensated; and $u_s$—host vehicle or sensor longitudinal velocity; $v_s$—host vehicle or sensor lateral velocity.

Step 3

In the next step a plurality of plausible velocity profile hypotheses is calculated/determined. The number of velocity profile hypotheses can be calculated from the range of expected over-the-ground velocity magnitudes of the target. For automotive applications, the interval of −250 km/h to 250 km/h is sufficient. For given maximum bounds of expected velocity, maximum and minimum possible range rate can be calculated.

Step 3

For each j-th hypothesis, modified range rates (between host vehicle and target) are calculated in respect of each point detection on the (rigid) target: it is to be noted that if measured radial velocity (range rate) is equal to $r_i$, the real value is close to one of hypotheses for radial velocity $\dot{r}_{i,j,cmp} = \dot{r}_{i,cmp} + j\dot{r}_{ua}$, where $\dot{r}_{i,cmp}$,—range rate compensated; $\dot{r}_{i,j,cmp}$—modified range rate compensated (range rate for hypothesis); $\dot{r}_{ua}$—unambiguous interval of range rate measurement from radar spec (see FIG. 6); j is the hypothesis integer and must be a whole positive or negative number; and $\dot{r}_{ua}$ is the interval of measured range rate is the difference between the upper limit and the lower limit on the FIG. 6 and is dictated by the radar specification Step 4

For each j-th hypothesis, a velocity profile components $c_{t,j}$ and $s_{t,j}$ of the hypothesis is calculated using e.g. Least Square method/Cloud algorithm referred to above. Various methods of determining these velocity components from range rate and azimuth angle θ are known, e.g.

$$\dot{r}_{i,j,cmp} = [\cos\theta_i \quad \sin\theta_i] \begin{bmatrix} c_{t,j} \\ s_{t,j} \end{bmatrix}$$

(cloud/velocity profile/).

In the next step velocity profile estimated range rates $\hat{\dot{r}}_{i,j}$, are calculated (from the determined velocity profile estimator). This may done be using the following equation $\hat{\dot{r}}_{i,j,cmp} = \tilde{c}_{t,j}\cos\theta_i + \tilde{s}_{t,j}\sin\theta_i$.

Step 5

The next step involves determining a measure of dispersion of difference between the velocity profile estimator range rates ($\hat{\dot{r}}_{i,j,cmp}$) for each velocity profile hypothesis from step f) and their respective modified range rates ($\dot{r}_{i,j,cmp}$). Thus, for each j-th hypothesis, the (e.g. unbiased) degree of dispersion between velocity profile estimator range rate (for the point detections "i" and the modified calculated range rates are determined. This could be regarded as determining the estimator of variance of range rate estimation.

Essentially this can be performed by looking generally for each hypothesis, at the difference between $\dot{r}_{i,j,cmp}$ and $\hat{\dot{r}}_{i,j,cmp}$, (residuals) for the point detections and selecting the velocity hypothesis that give the lowest overall deviations. Thus, effectively the residuals may be analyzed to determine the one with the lowest hypothesis variation of residuals. In other words, in this step the "best" hypothesis is selected, and can be done statistically in various ways e.g. by statistically analyzing residuals such as the mean, mode, median of the residuals. The term "determining a measure of the variance" should be interpreted hereinafter to include all of these options.

In one aspect, the variance between the velocity profile estimator range rate (for the point detections "i" and the modified calculated range rates) are determined from the following equations:

$$\widehat{\sigma}^2_{\dot{r},j} = \frac{\sum_{1}^{n}(\dot{r}_{i,j,cmp} - \hat{\dot{r}}_{i,j,cmp})^2}{n-2}.$$

Step 6

The velocity profile hypothesis with the lowest standard deviation or variance of range rate estimation is found. The velocity profile of the hypothesis is the de-aliased range rate.
Further Refinements.

For improvement and robustness one or more plausibility checks may be performed e.g. after step 6. Plausibility checks can be used to maximize probability that chosen velocity profile is dealiased. If defined plausibility checks are not meet, then it is safer to say that range rates cannot be dealiased. There can be several plausibility checks:

a) Determining the azimuth spread of detections, and comparing against a threshold. The azimuth spread should be above a threshold.
b) Calculating the determinant of Least Squared estimator and comparing with a threshold; this should be above the threshold.
c) Calculating standard deviation of residuals and comparing with a threshold value; it should be below the specified threshold.
d) Determining the number of velocity profile hypotheses for which standard deviation of residuals are below a threshold. Only one standard deviations should be below this threshold.

The lowest standard deviation of residuals is determined by statistical testing to determine if there is significant difference between it and the second lowest standard deviation.

Implementation Example

The methodology according to examples has been implemented and used verifying the de-alias status of a velocity profiles. This was applied when such verification is not available from a Tracker algorithm (de-aliasing in time). In Object Hypotheses implementation only one (j=0) velocity profile hypothesis is considered with two plausibility checks (7b, 7c).

Figure 7:
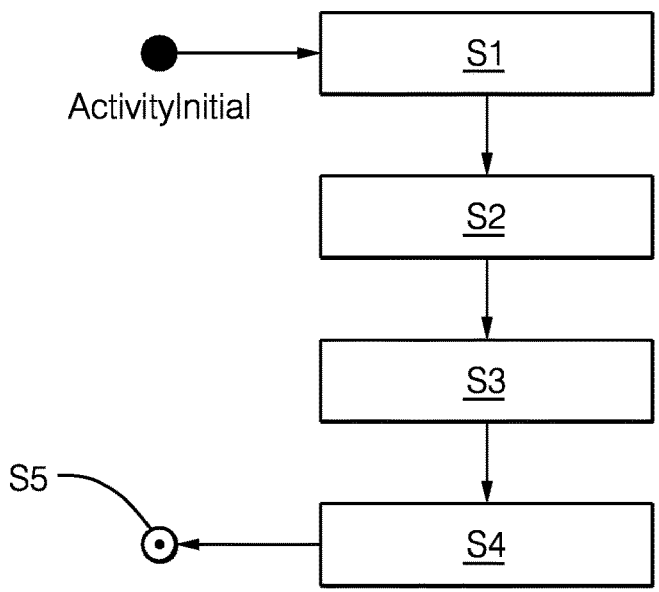
FIGS. 7 and 8 shows flow charts of the basic methods steps.

FIG. 7 shows a flow chart of the basic methods steps. The method starts and in step S1 where the velocity profiles are hypothesized. In step S2 the detections are analysed. In step S3 the de-aliasing parameter(s) are analysed for the velocity profiles and detection data. In step S4 the variance is calculated and Step S5 the final results are determined.

Figure 8:
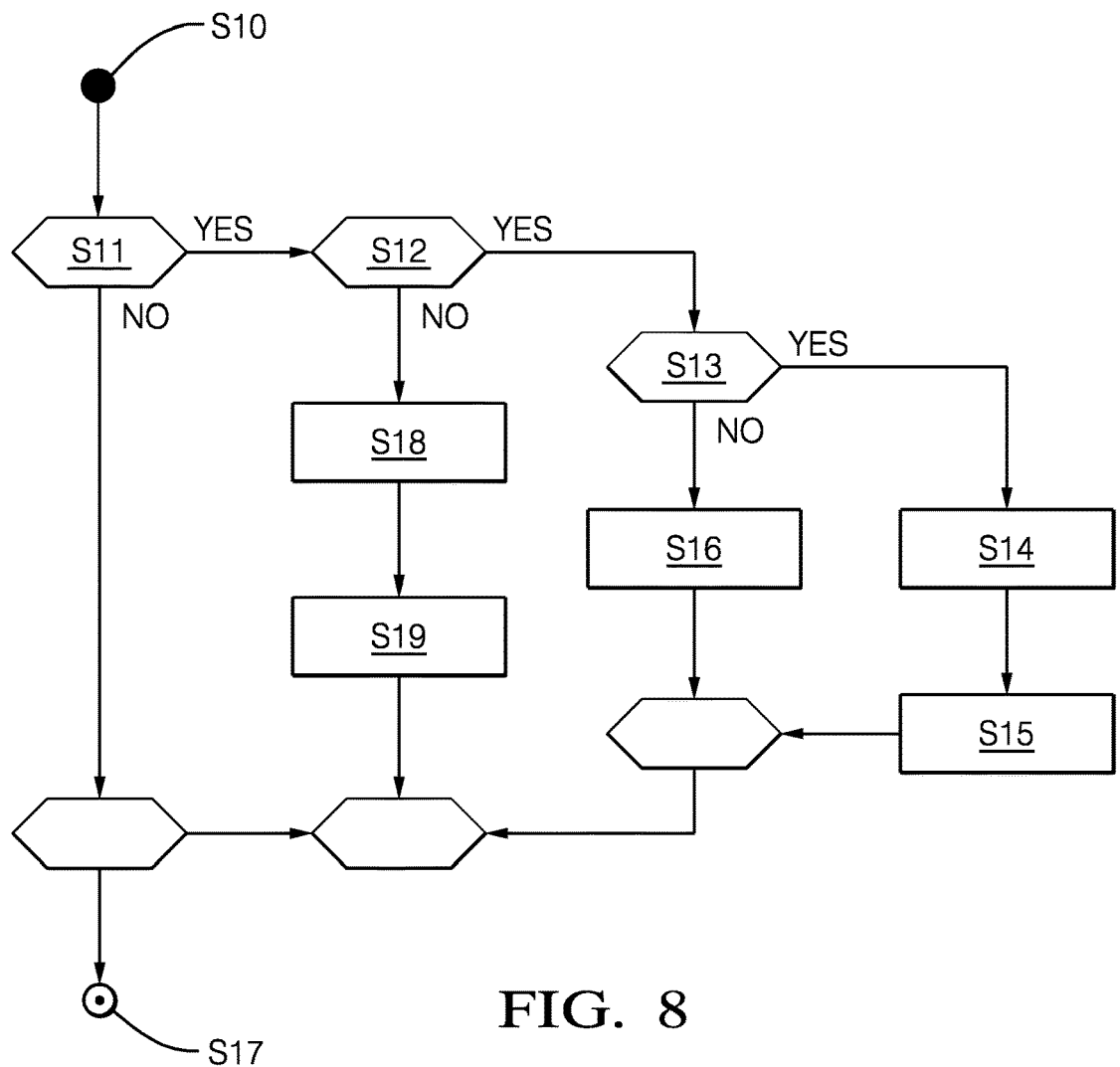

FIG. 8 shows the execution path of the OH De-Alias By Velocity Profile component. The process starts at step S10. As step S11 the de-alias status of the detection group is determined. If it is determined that it is not de-aliased the process moves to step S12 where it is determined if the determinant is greater than a threshold vale and there is enough reliable detections. If so the process moves to step S13 where it is determined if the range rate variance is greater than a variance dealiasing threshold or the determinant is less than a determinant de-aliasing threshold. If so the method moves to step S14 where the velocity profile calculations are reset (invalidated) and then further to S15 where the velocity status of all detections is set to a rejected status by the OH velocity analysis. If at step S13 the answer is NO, then the method moves to step S16 where the the de-alias values are set to a "de-aliased" state (by OH). The process after steps S15 and S16 moves to a final step at S17. In step S12 if the answer is no then the process moves to step S18 where the velocity profile estimations are reset. After this step the process moves to step S19 where the velocity status of verified detections is set to a rejected by OH velocity analysis.

Verification with Experimental Data

The effectiveness of the proposed de-aliasing algorithm is verified using experimental data. Three different scenarios were considered. The host vehicle was equipped with four sensors mounted in each corner of the car. Both the host and the target vehicles were equipped with a differential GPS system. Three relevant examples were considered:
  i) Target with no yaw rate.
  Target with high yaw rate.
  iii) Range rate measurements from a distributed target affected by aliasing In the first two examples i) and ii) it was examined if the methodology according to one aspect of the invention can verify that velocity profile does not require any correction due to range rate aliasing. The third example iii) examines if velocity profile of target with aliased range rate measurements can be de-aliased by the claimed methodology.

Example i

Figure 9A:
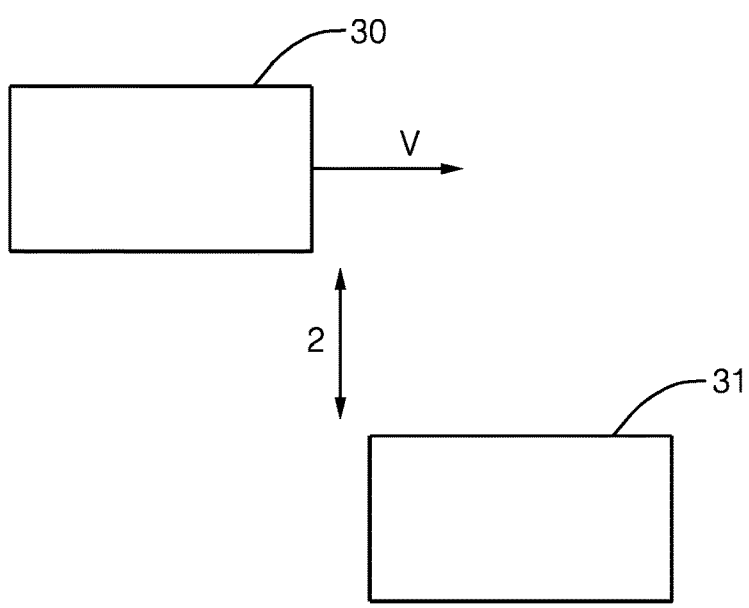
Figure 9B:
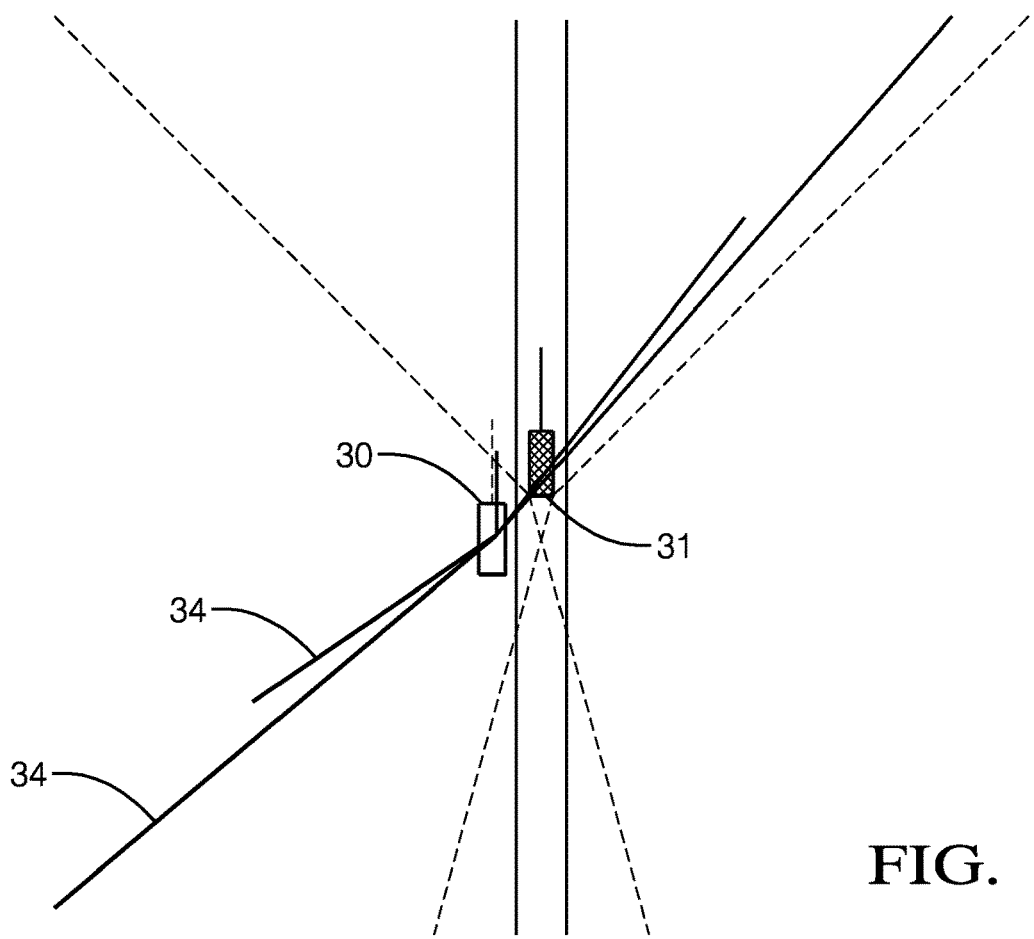
Figure 9C:
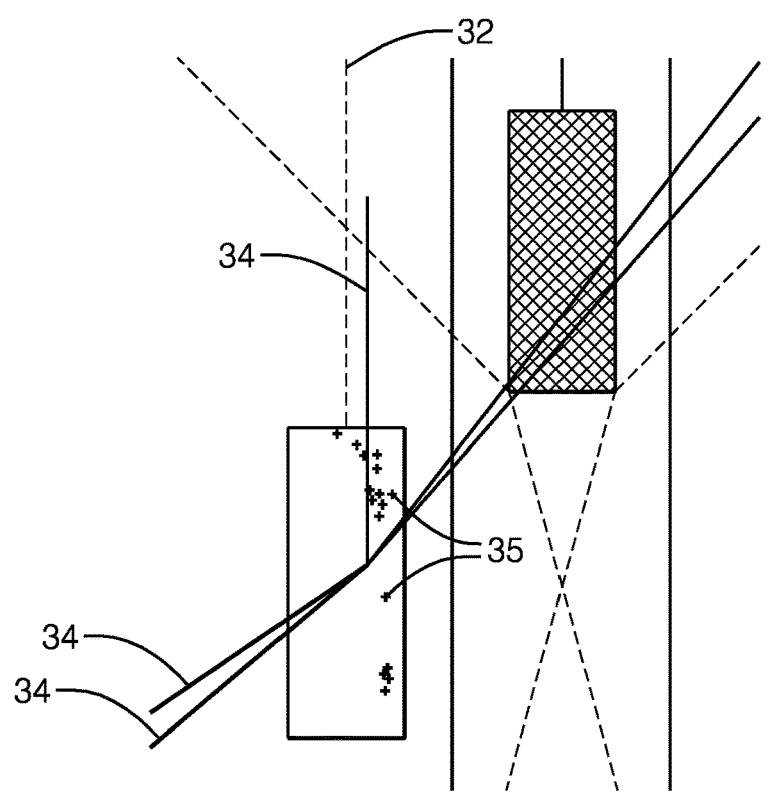

In this scenario, the target vehicle is overtaking the host vehicle 31, as seen in FIG. 9a. FIGS. 9b and 9c show diagrammatic representations of five velocity profile hypotheses in relation to FIG. 9a. The box 31 is the reference object (measured with the differential GPS) having the velocity vector specified for the center of the front bumper (dashed line 32). The lines 34 represent different hypotheses of velocity vector estimators. The crosses 35 represent raw detections from the distributed target.

Table 1 below shows the experimental results for the example 1.

| | Hypothesis index (j) | | | | |
|---|---|---|---|---|---|
| | −2 | −1 | 0 | 1 | 2 |
| $\tilde{c}_{t,j}$ [m/s] | −131.4 | −69.1 | −6.6 | 55.8 | 118.3 |
| $\tilde{s}_{t,j}$ [m/s] | 44.6 | 28.3 | 11.9 | −4.42 | −20.7 |
| $\sigma_{r,j}$ [m/s] | 3.86 | 1.95 | 0.13 | 1.9 | 3.81 |

Example ii

Figure 10A:
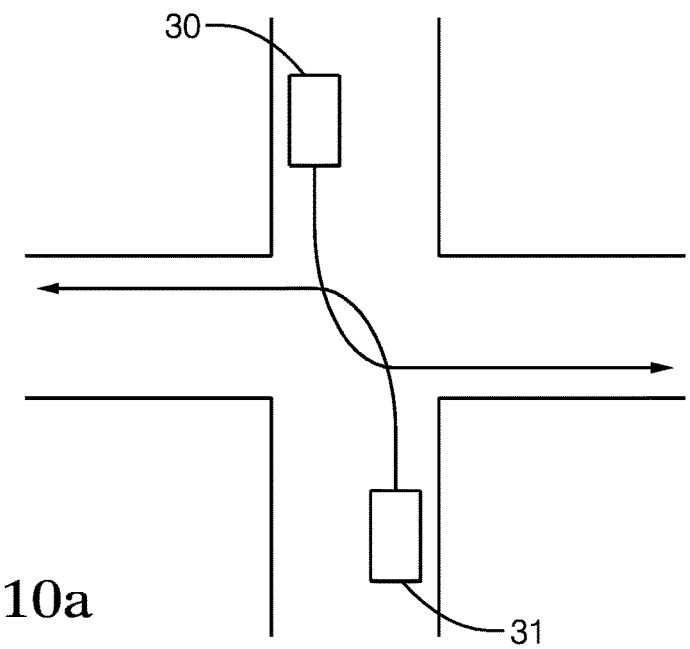
Figure 10B:
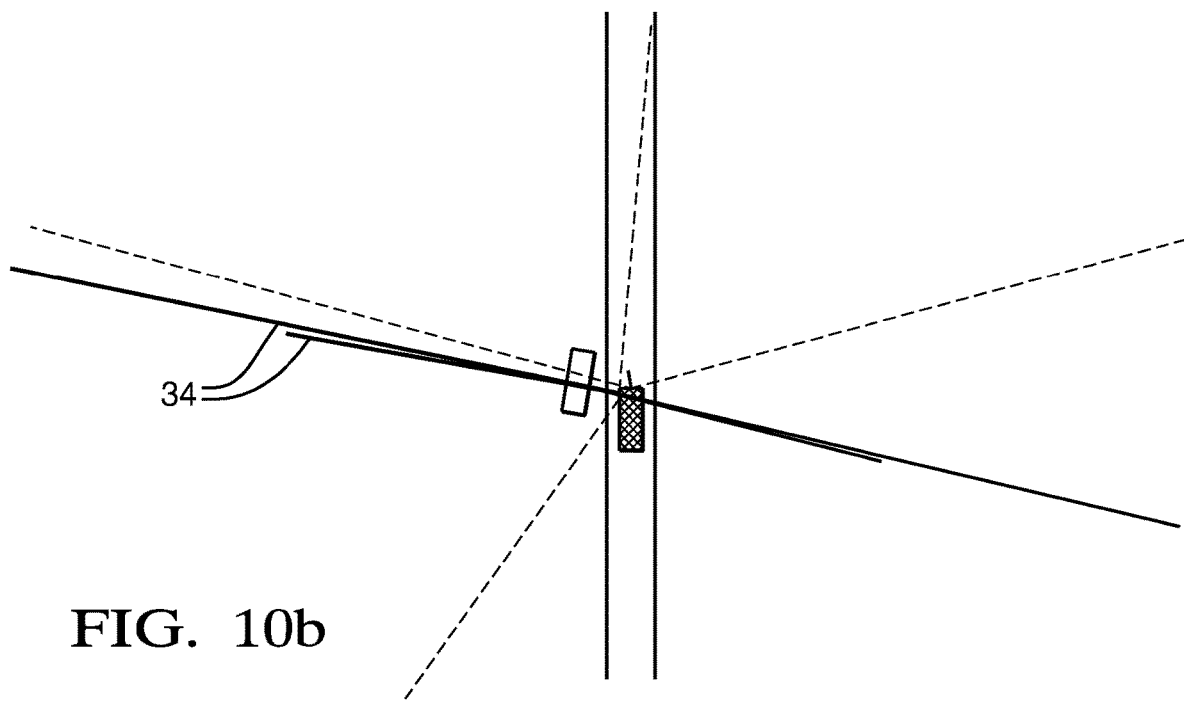
Figure 10C:
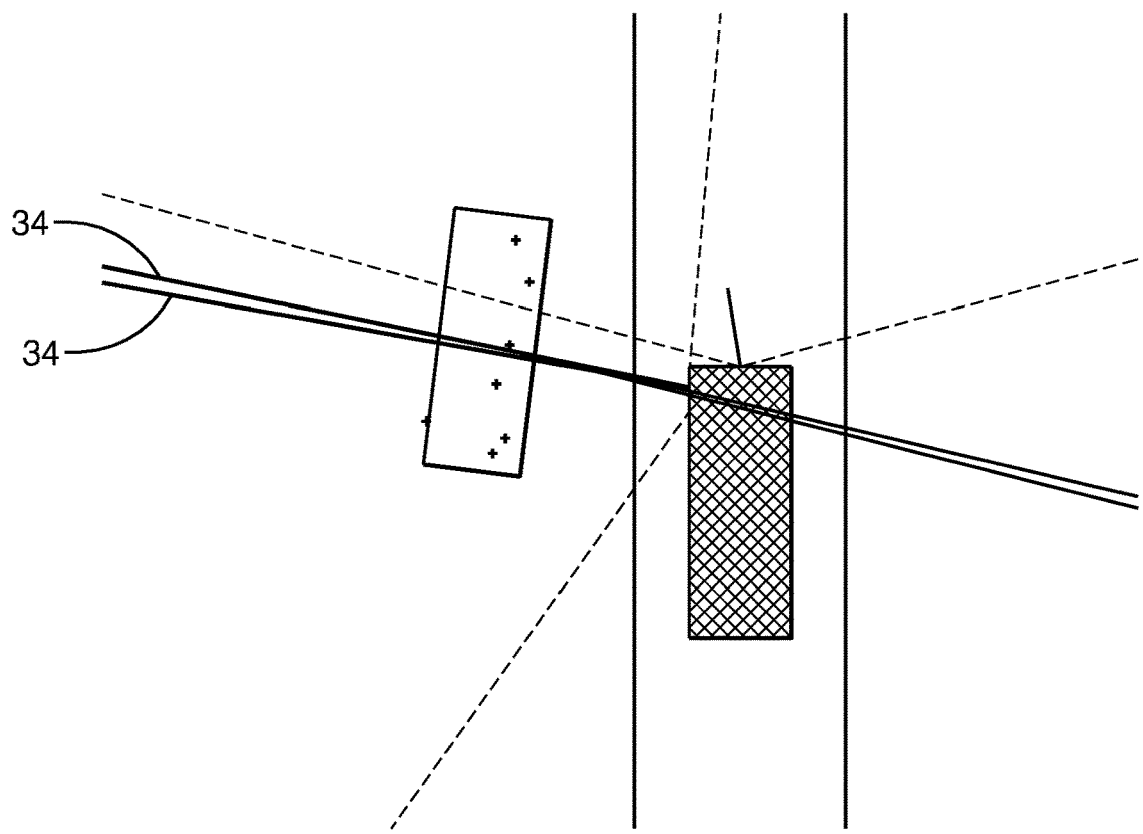

Here the scenario is intersection maneuvering as shown in FIG. 10a; same components have like reference numerals, and so the target had a high yaw rate. FIGS. 10b and 10c (similar to FIGS. 9b and 9c with like reference numerals) and the table below shows the results for five velocity profile hypotheses estimations.

Table 2. Experimental result for the example 2.

TABLE 2

Experimental result for the example 2.

| | Hypothesis index | | | | |
|---|---|---|---|---|---|
| | −2 | −1 | 0 | 1 | 2 |
| $\tilde{c}_{t,j}$ [m/s] | −131.5 | −66.2 | −0.9 | 64.3 | 129.7 |
| $\tilde{s}_{t,j}$ [m/s] | 15.5 | 6.78 | −1.99 | −10.7 | −19.5 |
| $\sigma_{r,j}$ [m/s] | 7.23 | 3.63 | 0.07 | 3.57 | 7.16 |

Example 3

Figure 11A:
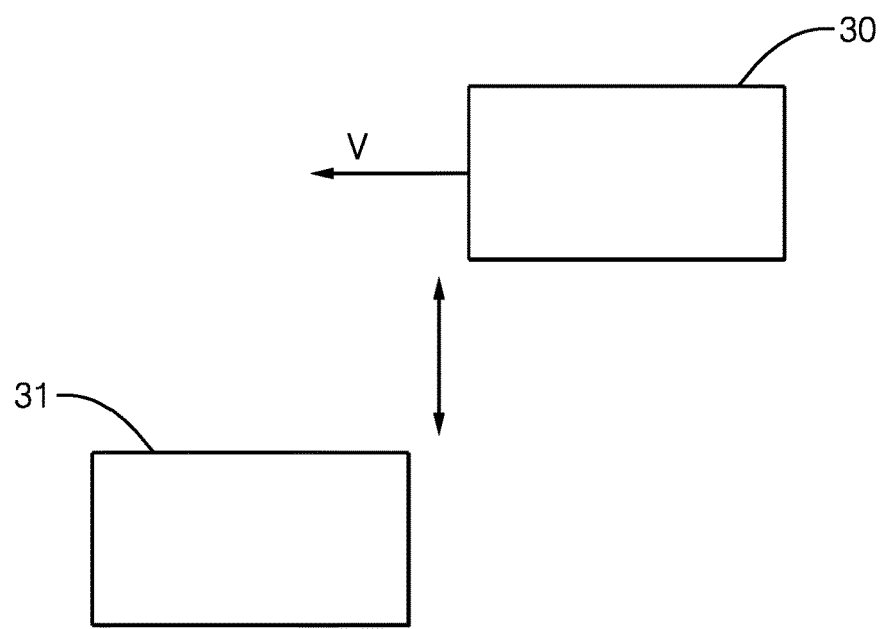
Figure 11B:
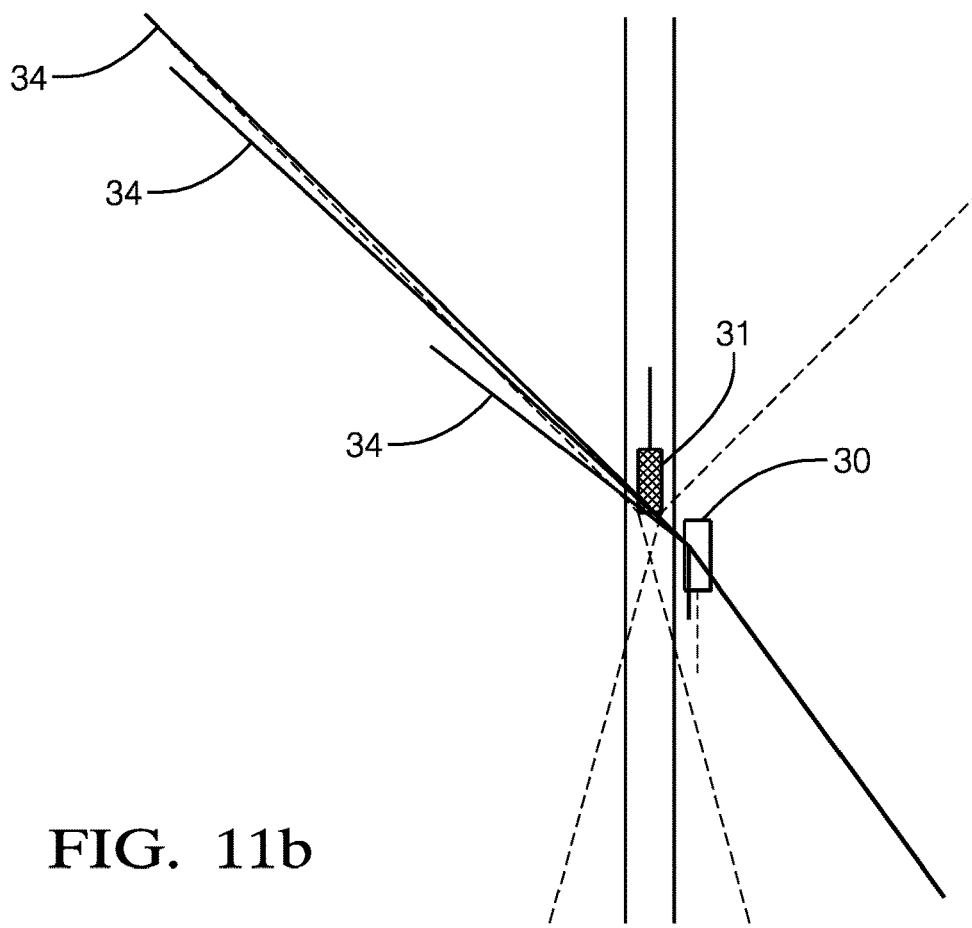
Figure 11C:
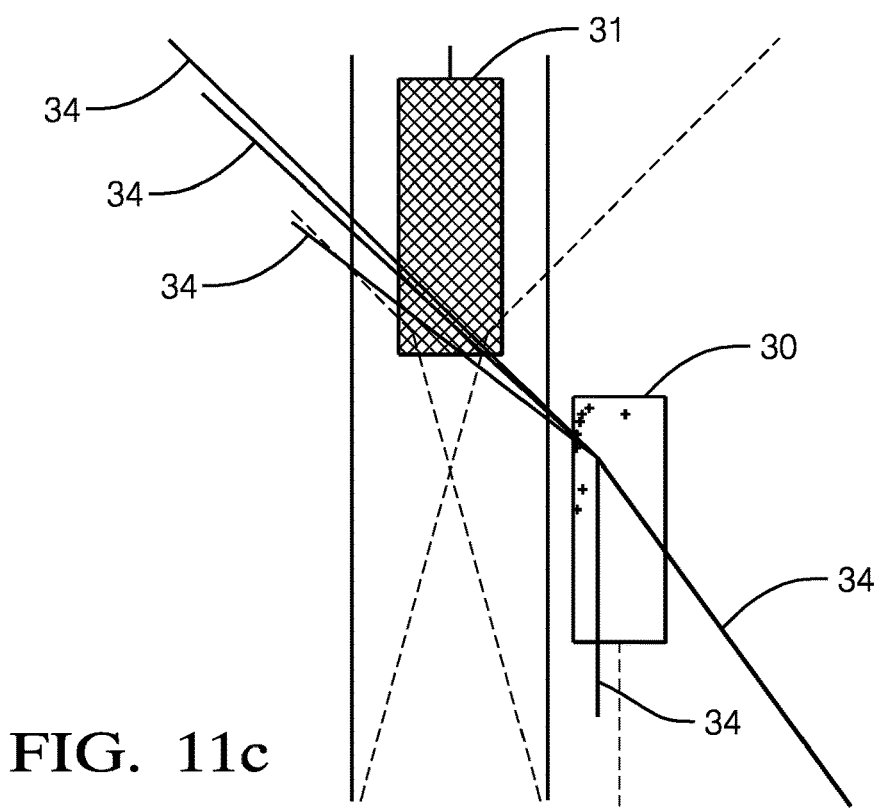

Table 1 below shows the experimental results for the example 1 This scenario is one with oncoming traffic with aliased range rate measurements, as shown by FIG. 11a, and FIGS. 11b and 11c shows five velocity profile hypothesis estimations (similar to FIGS. 9b and 9c with like reference numerals). And table 3 below shows the experimental result for the example.

TABLE 3

| | Hypothesis index | | | | |
|---|---|---|---|---|---|
| | −2 | −1 | 0 | 1 | 2 |
| $\tilde{c}_{t,j}$ [m/s] | −197.4 | −129.3 | −61.31 | 6.75 | 74.8 |
| $\tilde{s}_{t,j}$ [m/s] | −50.72 | −29.76 | −8.81 | 12.13 | 33 |
| $\sigma_{\dot{r}}$, j [m/s] | 2.78 | 1.82 | 0.88 | 0.2 | 1.06 |

All three examples confirm that algorithm can be effectively used for the verification of velocity profile. The methodology works well because of the statistic properties of the Least Square solution of the velocity profile equation. A generic equation of a sine function can be written as y=A sin(ωx+φ)+B, where: A—amplitude; ω—frequency; φ—phase shift; and B—offset.

The velocity profile equation can be written as y=A sin(x+φ).

There are two unknown parameters in this equation so there have to be at least three observations to calculate variance of residuals. Moreover, the frequency of the sine function is constant and equal to 1 (i.e. ω=1), and the offset is also constant and equal to 0 (i.e. B=0). These two features are critical. For each velocity profile hypothesis, the range rates ('y') are incremented by a multiple of the unambiguous range rate interval. If the offset of the sine equation was not constant, then the Least Square solutions for different hypotheses detections would only differ by offset estimation (different hypotheses would result in the same quality of fit, but different B). In the proposed approach with fixed sine function offset, the Least Square solutions for different hypotheses result in significantly different velocity vectors. Because of that fact the variance of residuals varies. Moreover, if the interval of unambiguous range rate measurement is sufficiently large then the difference between estimated variances is statistically significant.

Results 1

Figure 12A:
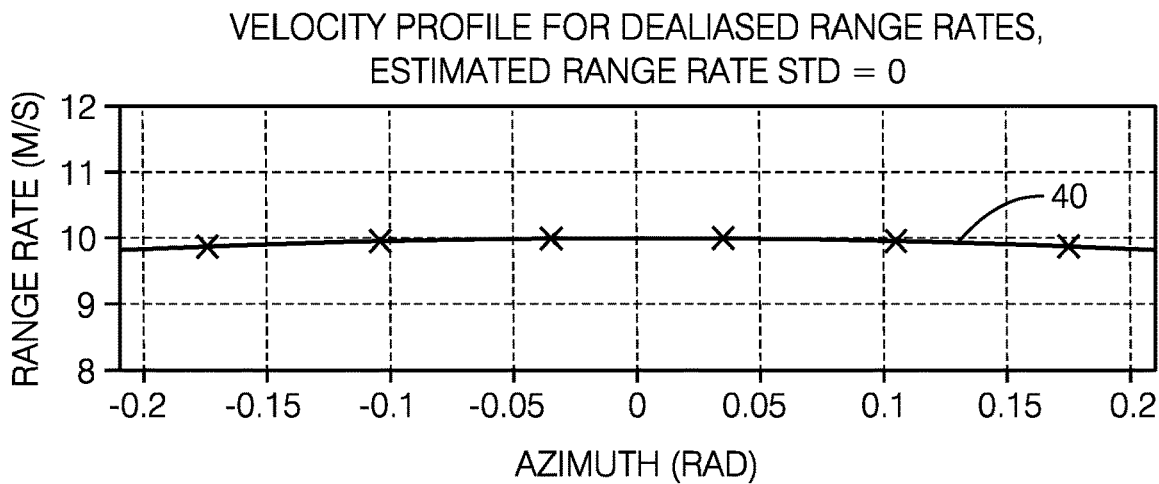
FIGS. 12a, 12b and 12c shows the results of a first test showing generally range rates against azimuth.
Figure 12B:
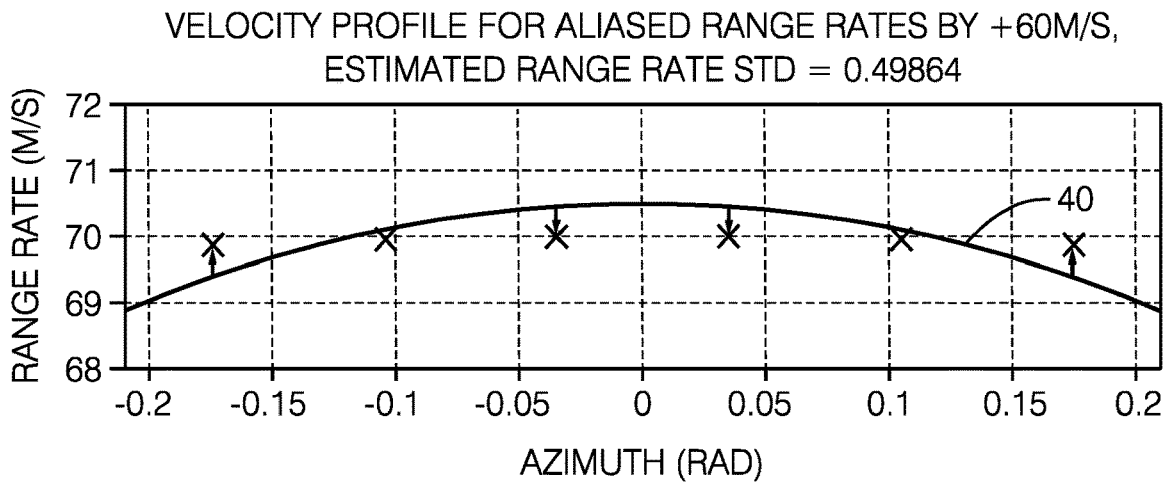
Figure 12C:
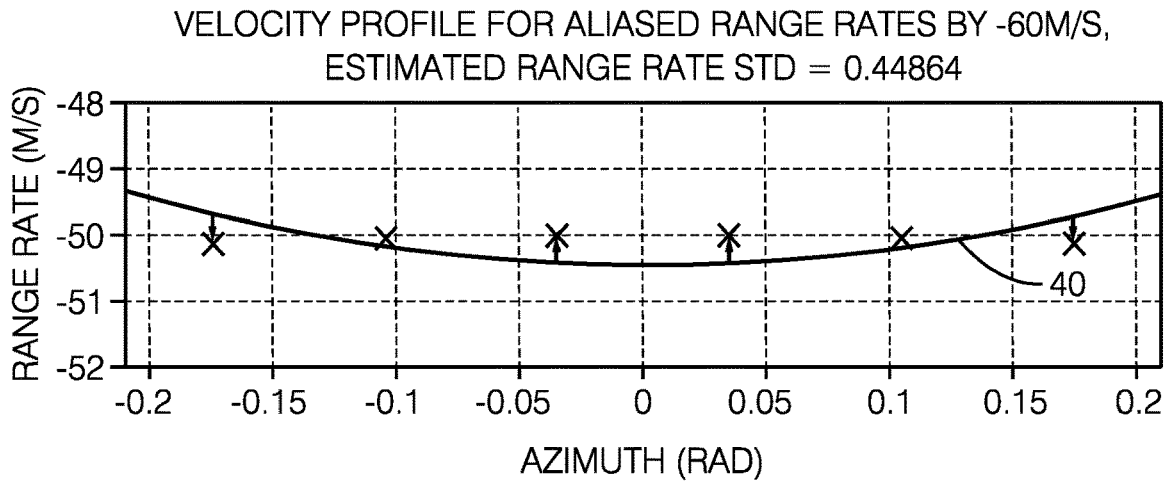

An example of the methodology with to six detections from a target with Vx=10 m/s and Vy=0 m/s was considered. In the first experiment, noise free measurements were used as inputs. The variance of the range rate estimation for the correct velocity profile hypothesis is equal to zero. For all other hypotheses the variance is bigger than zero. FIGS. 12a, 12b and 12c shows the results of this test showing generally range rates against azimuth, for velocity hypothesis profiles of 0, +60 and −60 m/s respectively. Reference 40 shows the velocity profile range rates and the range rates of detections shown with crosses, and deviation between the two as thick arrows.

In a second experiment the following radar parameters were used to model measurement noise and aliasing:

$$\sigma_{\dot{r}} = 0.03 \left[\frac{m}{s}\right] \quad \sigma_\theta = 0.5[°] \quad \dot{r}_{res} = 60 \left[\frac{m}{s}\right]$$

Figure 13A:
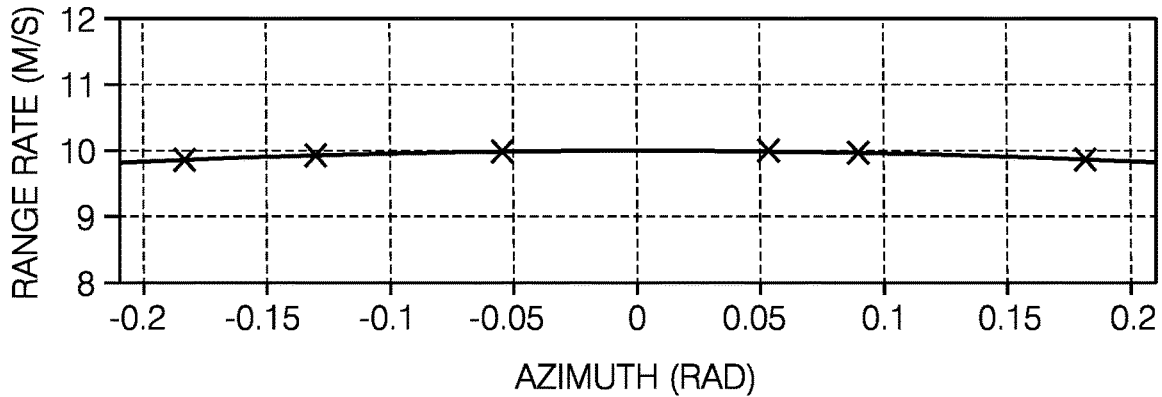
FIGS. 13a, 13b and 13c shows the results of a second test showing generally range rates against azimuth.
Figure 13B:
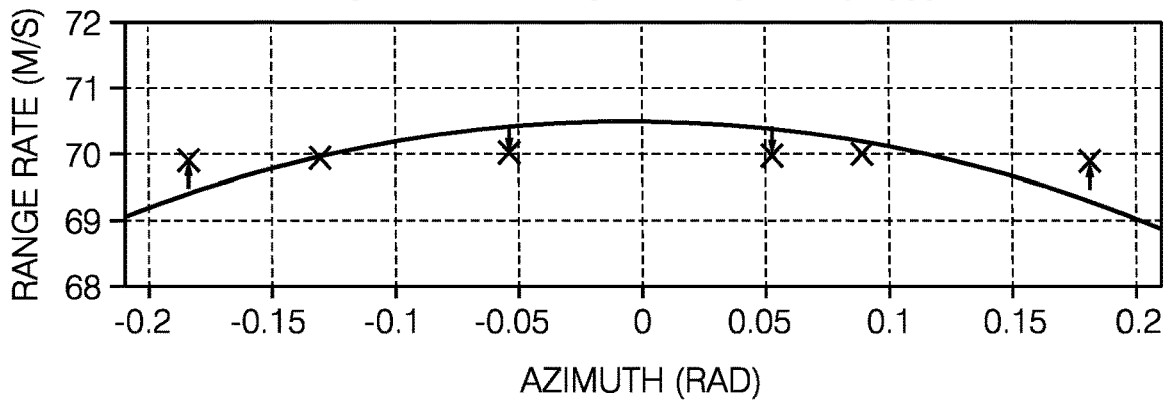
Figure 13C:
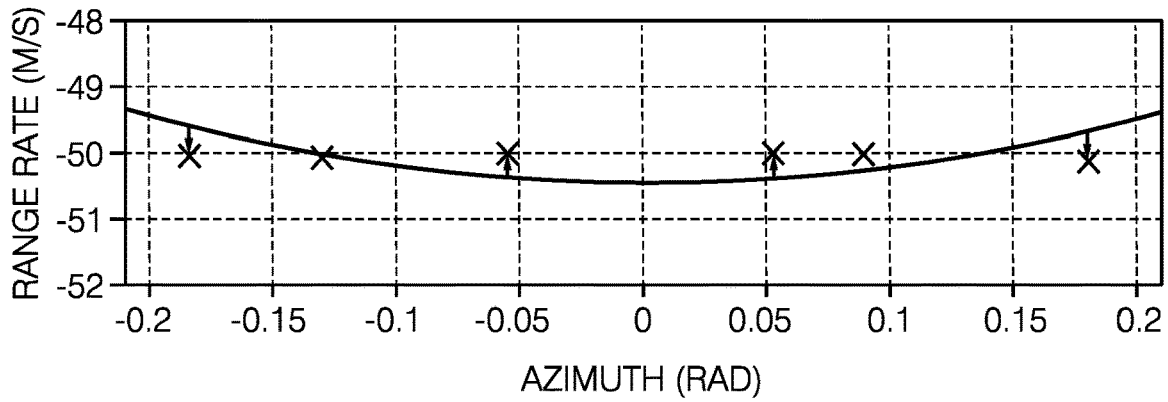

FIGS. 13a, 13b, and 13c shows the equivalent graphics for this test similar to FIGS. 12a, 12b, and 12c respectively.

As expected, the variance of range rate estimation for the correct velocity profile hypothesis is bigger than 0, but still variances for incorrect aliasing corrections are significantly higher. FIG. 11 shows the velocity profile in azimuth—range rate coordinates without range rate and azimuth measurement noise. The hypotheses of velocity profile were considered.

As an alternative to the presented approach, instead of the variance of range rates residuals, the variance of velocity profile ($\tilde{c}_{t,scs}$ and $\tilde{s}_{t,scs}$) can be analyzed.

The methodology according to aspects provided instantaneous estimation of velocity for oncoming traffic vehicles, and reduces the time of ambiguous velocity estimation of tracked objects. The methods improve plausibility checks of velocity estimation and improves initialization of tracked objects when objects enter the field of view of the sensor at close range. The approach has a sound statistical background and does not require time-filtering/tracking. The methodology does not require the detection of yawing of the target and does not rely on any target motion model. The methodology is suitable for applications in production embedded systems because of its low computational complexity. It h can be immediately used in state-of-art short range radars for estimation of objects at low range. The accuracy of the results can only be improved if more detections from moving objects were available or accuracy and resolution of the radar measurement was improved.

We claim:

1. A method of determining the de-aliased range rate of a target in a horizontal plane by a host vehicle equipped with a radar system, said radar system including a radar sensor unit adapted to receive signals emitted from said host vehicle and reflected by said target, said method comprising:
   a) emitting a radar signal at a single time-point instance and determining from a plurality (m) of point radar detections measurements therefrom captured from said radar sensor unit, the values for each point detection of, azimuth and range rate [$\theta_i$, $\dot{r}_i$];
   b) for each point detection determining a range rate compensated value ($\dot{r}_{i,cmp}$) from the output of step a) and the vehicle or sensor unit speed from the following equation $\dot{r}_{i,cmp} = \dot{r}_i + u_s \cos\theta_i + v_s \sin\theta_i$, where $u_s$ is the host vehicle or sensor longitudinal velocity and $v_s$ is the host vehicle or sensor lateral velocity;
   c) determining a plurality (j) of velocity profile hypotheses;
   d) for each (j-th) hypothesis determining modified compensated hypothesis range rates) ($\dot{r}_{i,cmp}$) in respect of each point detection on the target, based on the values of range rate compensated ($\dot{r}_{i,cmp}$) determined from step b) from the following equation $\dot{r}_{i,j,cmp} = \dot{r}_{i,cmp} + j\dot{r}_{ua}$, where $\dot{r}_{ua}$ is the interval of measured range rate;
   e) for each j-th hypothesis, determining values of the longitudinal and lateral components of the range rate equation of the target $\tilde{c}_{t,j}$ and $+\tilde{s}_{t,j}$ from the results of step d) and a) where the range rate equation is $$\dot{r}_{i,j,cmp} = [\cos\theta_i \quad \sin\theta_i]\begin{bmatrix}c_{t,j}\\s_{t,j}\end{bmatrix};$$

f) for each j-th hypothesis and for each point detection determining a velocity profile estimator range rate ($\hat{\dot{r}}_{i,j,cmp}$) calculated from the following equation $\hat{\dot{r}}_{i,j,cmp} = \tilde{c}_{t,j} \cos\theta_i + \tilde{s}_{t,j} \sin\theta_i$, where the values of $\theta_i$ are determined from step a) and $\tilde{c}_{t,j}$ and $\tilde{s}_{t,j}$ the values of velocity profile components from step e);

g) for each hypothesis, for one or more point detections, determining a measure of the dispersion of, or variation between the velocity profile estimator range rates ($\hat{\dot{r}}_{i,j,cmp}$) for each velocity profile hypothesis from step f) and their respective modified range rates ($\dot{r}_{i,j,cmp}$) from step d), or the dispersion of, or variation between, one or both of the velocity profile components $\tilde{c}_{t,j}$ and $\tilde{s}_{t,j}$ for each velocity profile hypothesis, and selecting the velocity profile where said measure of dispersion or variation is the lowest; and h) setting the de-aliased range rate as the velocity of the velocity hypothesis selected from step g).

2. A method as claimed in claim 1 wherein the radar system includes four radar sensor units, each of the radar sensor units being adapted to perform a method according to claim 1.

3. A method as claimed in claim 1, wherein velocity profile components $\tilde{c}_{t,j}$ and $\tilde{s}_{t,j}$ are determined from least squares methodology.

4. A method as claimed in claim 1 including determining for each velocity hypothesis, a measure of the dispersion or average value, in respect of each point detection, of the differences between the values of the velocity profile estimator range rates from step f) and the respective modified hypothesis range rates from step d).

5. A method as claimed in claim 1, wherein said measure of the dispersion or variation is determined from the following formula, where n is the number of point detections used in the calculation $$\frac{\sum_{1}^{n}\left(\dot{r}_{i,j,cmp}-\hat{\dot{r}}_{i,j,cmp}\right)^{2}}{n-2}.$$

* * * * *